(12) United States Patent
Misra et al.

(10) Patent No.: US 6,885,692 B2
(45) Date of Patent: Apr. 26, 2005

(54) EFFICIENT SPREADER FOR SPREAD SPECTRUM COMMUNICATION SYSTEMS

(75) Inventors: Raj Mani Misra, Brooklyn, NY (US); Gregory S. Teal, Boothwyn, PA (US)

(73) Assignee: InterDigital Technology Corporation, Wilmington, DE (US)

(*) Notice: Subject to any disclaimer, the term of this patent is extended or adjusted under 35 U.S.C. 154(b) by 701 days.

(21) Appl. No.: 09/810,596

(22) Filed: Mar. 16, 2001

(65) Prior Publication Data

US 2002/0009127 A1 Jan. 24, 2002

Related U.S. Application Data

(60) Provisional application No. 60/191,884, filed on Mar. 23, 2000.

(51) Int. Cl.[7] .............................................. H04L 27/30
(52) U.S. Cl. ...................... 375/140; 375/146; 375/343; 370/320; 370/342; 370/441; 370/479
(58) Field of Search ................................. 375/130, 140, 375/141, 146, 343, 260, 261; 370/320, 342, 335, 441, 479

(56) References Cited

U.S. PATENT DOCUMENTS

| | | | |
|---|---|---|---|
| 6,031,865 A | * | 2/2000 | Kelton et al. ................ 375/130 |
| 6,097,714 A | | 8/2000 | Nagatani et al. |
| 6,151,328 A | * | 11/2000 | Kwon et al. ................ 370/441 |
| 6,512,737 B1 | * | 1/2003 | Agee ........................... 370/208 |

FOREIGN PATENT DOCUMENTS

| | | |
|---|---|---|
| GB | 2300545 A | 11/1996 |
| JP | 10190625 | 7/1998 |

OTHER PUBLICATIONS

Kevin Laird, Nick Whinnett & Soodesh Buljore, "A Peak–To–Average Power Reduction Method for Third Generation CDMA Reverse Links", 1999 IEEE 49th Vehicular Technology Conference, Houston, TX, USA, May 16–20, 1999.

* cited by examiner

Primary Examiner—Dac V. Ha
(74) Attorney, Agent, or Firm—Volpe and Koenig, P.C.

(57) ABSTRACT

A spreading system and method for CDMA applications that requires fewer integer multiplications. User data is spread using real or complex integer based spreading codes of length SF to $SF_{max}$ chips. At least one of the codes is of the form $j^n \cdot v[n]$ where $v[n]$ is a spreading code. The invention provides increased user separation using a plurality of spreading codes.

14 Claims, 13 Drawing Sheets

EFFICIENT SPREADER FOR SPREAD SPECTRUM COMMUNICATION SYSTEMS

CROSS-REFERENCE TO RELATED APPLICATIONS

This application claims the benefit of U.S. Provisional Patent application No. 60/191,884; filed Mar. 23, 2000.

BACKGROUND

The present invention relates generally to digital communication systems. More specifically, the invention relates to a system and method for spreading a data signal for spread spectrum communications.

A communication system typically transmits information or data using a continuous frequency carrier with modulation techniques that vary its amplitude, frequency or phase. The information to be transmitted is mapped onto a predetermined constellation that defines symbols and is transmitted over a communication medium. The communication medium may be guided or unguided, (comprising copper, optical fiber or air) and is commonly referred to as the communication channel.

Deployed communication systems rarely are single access. A prior art multiple-access communication system is shown in FIG. 1. Protocols such as time division multiple access (TDMA), carrier sense multiple access (CSMA), code division multiple access (CDMA) and frequency related protocols such as frequency division multiple access (FDMA) and orthogonal frequency division multiplexing (OFDM) allow a plurality of users to access the same communication media to transmit or receive information. These techniques can be mixed together creating hybrid varieties of multiple-access communication schemes such as time division duplex (TDD). The access protocol specified by a communication system is typically executed after the data undergoes modulation.

Prior art modulation techniques that are in use are frequency modulation (FM), frequency shift keying (FSK), phase shift keying (PSK), binary phase shift keying (BPSK) and differential phase shift keying (DPSK). The most commonly used high-speed methods for data modulation are quadrature amplitude modulation (QAM) and quadrature phase shift keying (QPSK). These techniques vary a predefined carrier frequency amplitude and phase according to an input signal to transmit multiple bits per baud thereby using available bandwidth more efficiently.

To extend the possible range of data signal values, quadrature modulation assigns a symbol to represent more than two binary values. The use of a symbol allows for a greater degree of transmitted information since the bit content of each symbol dictates a unique pulse shape. Symbols, which consist of x bits per sample, may represent a quantized version of an analog sample or digital data. Depending upon the number of symbols used, an equal number of unique pulseshapes or waveshapes exist. The number of data bits determine the combinations of amplitude and phase that define a constellation pattern.

Quadrature modulation is based on two distinct waveforms that are orthogonal to each other. If two waveforms are transmitted simultaneously and do not interfere with each other, they are orthogonal. Quadrature modulation modulates two different signals into the same bandwidth creating a two-dimensional signal space as shown in FIG. 2. Two waveforms generally used for quadrature modulation are sine and cosine waveforms at the same frequency. The waveforms are defined as:

$$s_1(t) = A\cos(2\pi f_c t) \quad (1)$$

and $$s_2(t) = A\sin(2\pi f_c t) \quad (2)$$

where $f_c$ is the carrier frequency of the modulated signal and A is the amplitude applied to both signals. By convention, the cosine carrier is called the in-phase (I), real component of the signal and the sine carrier is the quadrature (Q), imaginary component of the signal. Linear combinations of the form $\alpha_1 \cos(2\pi f_c t) + \alpha_2 \sin(2\pi f_c t)$, (where $\alpha_1$ and $\alpha_2$ are real numbers), generated from the two basic waveforms define symbols in the modulation alphabet. The symbols can be represented as complex numbers, $\alpha_1 + j\alpha_2$, where j is defined as $j = \sqrt{-1}$ A QAM symbol consists of at least one sample from both the in-phase I and quadrature Q signals. Signal amplitude is indicated by the distance from the origin; phase by the angular distance around the unit circle. After the data is assembled as symbols, the symbols are processed in accordance with an access protocol chosen for the communication system.

A prior art CDMA communication system is shown in FIG. 3. CDMA is a communication technique in which data is transmitted with a broadened band (spread spectrum) by modulating the data to be transmitted with a pseudo-noise sequence. The data signal to be transmitted may have a bandwidth of only a few thousand Hertz distributed over a frequency band that may be several million Hertz. The communication channel is used simultaneously by k independent subchannels. For each subchannel k, all other subchannels appear as interference.

As shown, a single subchannel of a given bandwidth is mixed with a unique spreading code which repeats a predetermined pattern generated by a wide bandwidth, pseudo-noise (pn) sequence generator. These unique user spreading codes are typically pseudo-orthogonal to one another such that the cross-correlation between the spreading codes is close to zero. The spreading codes in a CDMA system are chosen to minimize interference between a desired subchannel and all other subchannels. A data signal is multiplied with the pn-sequence to spread the data signal and produce a digital spread spectrum signal. A carrier signal is modulated with the digital spread spectrum signal and transmitted on the communication channel. A receiver demodulates the transmission to extract the digital spread spectrum signal. The transmitted data is reproduced after correlation with the matching pn sequence. When the spreading codes are orthogonal with one another, the received signal can be correlated with a particular user signal related to a particular spreading code such that only the desired user signal related to the particular spreading code is enhanced, while the other signals for all other users are not enhanced.

Each element of the spreading code is known as a chip and belongs to the set {1, −1}. The chip frequency or rate is the same or faster than the data rate. The ratio between the chip rate and the subchannel data rate is referred to as the spreading factor and is equal to the number of chips that are used to spread one symbol of user data. The number of chips is divisible by the largest spreading factor allowed. The larger the spreading factor, the more resistant a symbol is to noise and interference. For the case of synchronous CDMA, a symbol from the user with the largest spreading factor may constitute an entire block of data.

CDMA is one access protocol called for in the proposed $3^{rd}$ generation wireless communication standards. Shown in FIG. 4 is a system architecture of a CDMA spreader making use of variable spreading factors. Variable spreading factors allow a transmitter to fine tune overall system processing gain. Higher data rate users are assigned spreading codes having a lower spreading factor at the expense of reduced processing gain. Lower data rate users are assigned spreading codes having a higher spreading factor. Therefore, the overall bandwidth of the spread signal of all users is maintained to be the same.

To reduce the overall number of spreading codes for each user in a given communication system, different spreading codes are used for cell separation and user separation, resulting in a two-part spreading operation for each subchannel. Channelization codes are used for user separation and scrambling codes for cell separation. Although a two-part spreading operation is characteristic of cellular CDMA systems, a single spreading operation maybe used in other applications. Here, the channelization and scrambling codes are replaced by a single code that separates each user.

To effect the spreading operation of k subchannel users in a physical system, linear spreading methods are executed as fixed gate arrays, microprocessors, digital signal processors (DSPs), application specific integrated circuits (ASICs) and the like. Fixed logic systems allow for greater system speed while microprocessor driven systems offer programming flexibility. Either implementation that is responsible for performing the spreading functions perform a sequence of mathematical operations. The following variables typically define the structure and operation of a spreader:

$\underline{c}$=the real integer channelization spreading code presented as a vector for subchannel k corresponding with a given spreading factor SF. The length of the channelization code $\underline{c}$ varies with different spreading factors SF.

d=the data transmitted in a subchannel k.

$\underline{d}$=the data in a subchannel k after modulation. The data is presented in the form of a vector, where a vector is an array of data indexed by a single index variable. For the purposes of vector operations which follow, all vectors are defined as column vectors.

k=one subchannel, (k=1, 2, 3, . . . K).

N=the number of data symbols in a group of the $k^{th}$ subchannel, (N=$SF_{max}$/SF). For the case of synchronous CDMA, a symbol from the user with the largest spreading factor may constitute an entire block of data. Each subchannel k has its own group size N where N can equal 1 (for SF=$SF_{max}$) to $SF_{max}/SF_{min}$.

i=the $i^{th}$ symbol of data $\underline{d}$, (i=1, 2, 3, . . . N).

n=the element reference of a vector, ([n]).

SF=the spreading factor of subchannel k.

$SF_{min}$=the minimum spreading factor of the communication system.

$SF_{max}$=the maximum spreading factor of the communication system.

$\underline{v}$=the real, integer part of the scrambling code.

$\underline{\tilde{v}}$=the complex scrambling code presented as a vector of length $SF_{max}$. $\tilde{v}[n]=j^n \cdot v[n]$, where n=1 . . . $SF_{max}$. Note that v[n] & $\tilde{v}[n]$ reference the $n^{th}$ element of the vectors $\underline{v}$ & $\underline{\tilde{v}}$. Thus, $\tilde{v}[n]=j^n \cdot v[n]$ defines the rule for deriving the $n^{th}$ element of $\underline{\tilde{v}}$ from the $n^{th}$ element of $\underline{v}$.

$\underline{z}_i$=the final spread chip sequence resulting from the application of the channelization and scrambling codes on the $i^{th}$ symbol of subchannel k. $z_i[n]=d_i \cdot c[n] \cdot j^{SF(i-1)+n} \cdot v[SF(i+1)+n]$, where n=1 . . . SF. $\underline{z}_i$ is SF chips long; the spreading factor chosen for that particular subchannel k. N such SF long $\underline{z}_i$ form $\underline{z}$ of length $SF_{max}$.

To simplify the description that follows, a two-part, prior art spreader for a $k^{th}$ subchannel is discussed. One skilled in this art appreciates that a plurality of k spread subchannels can be summed as shown in FIG. 4. After data has been modulated, where data d of subchannel k is assembled as symbols defining a predetermined constellation, a sequence of complex data symbols $\underline{d}$ is divided into groups containing N symbols each, defined by:

$$N = \frac{SF_{max}}{SF}. \quad (3)$$

Each complex data symbol d within a group of N symbols is spread by a real integer channelization code $\underline{c}$ of length SF chips. The channelization code $\underline{c}$ is unique to a user k. All N channelization code $\underline{c}$ spread symbols $\underline{d}$ of the group N are concatenated.

The resulting spread symbol sequence $SF_{max}$ chips long is multiplied by a complex scrambling code $\underline{\tilde{v}}$ of length $SF_{max}$ to produce a final chip sequence $\underline{z}$ of length $SF_{max}$. The scrambling code $\underline{\tilde{v}}$ is derived from a real integer scrambling code $\underline{v}$ multiplied with a complex operator $j^n$. The relation is:

$$\tilde{v}=j^n \cdot v[n], \text{ where } n=1 \ldots SF_{max}. \quad (4)$$

The result of the two-part spreading process is a vector $\underline{z}$ of length $SF_{max}$ chips. This vector $\underline{z}$ can be expressed as a concatenation of N subvectors, $\underline{z}_i$, where i=1, 2, 3, . . . N, where $\underline{z}_i$ is defined as the segment of length SF chips within $\underline{z}$ that represents the contribution of subchannel k's $i^{th}$ spread symbol, $d_i$, in the group. The $n^{th}$ element of $\underline{z}_i$ is given by:

$$z_i[n]=d_i \cdot c[n] \cdot j^{SF(i-1)+n} \cdot v[SF(i+1)+n],$$

where n=1, . . . SF and i=1, 2, 3, . . . (5)

v[SF(i+1)+n], where n=1, . . . SF, defines a different set of SF elements of $\underline{v}$, starting with the $(SF(i-1)+1)^{th}$ element depending upon i.

Implementing the two-code spreading operation defined by Equation 5 would require 8(N)(SF) integer multiplications to spread a symbol sequence $\underline{d}$ of length N symbols for one subchannel k. 2(SF) multiplications are required for the $d_i \cdot c[n]$ (where n=1, . . . SF) product (for one symbol) and 2(SF) multiplications are required for the $j^{SF(i-1)+n} \cdot v[n]$ product (for one symbol) (where n=1, . . . SF) since $d_i$ and $j^n$ are complex numbers multiplied with real numbers. Since both intermediate products are complex, the partial product multiplication requires four operations per symbol yielding a total of 8(N)(SF) multiplications.

In order to conserve power for operation in a mobile/portable communication system while increasing data throughput, an efficient process is needed to implement multiple code spreading operations.

SUMMARY

The present invention is a spreading system and method for CDMA applications that requires fewer integer multiplications. User data is spread using real or complex integer-based spreading codes of length SF to $SF_{max}$ chips. At least one of the codes is of the form $j^n \cdot v[n]$ where v[n] is a spreading code. The invention provides increased user separation using a plurality of spreading codes.

Accordingly, it is an object of the invention to provide a less complex system and method for spreading a data signal using more than one spreading code.

Other objects and advantages of the system and method will become apparent to those skilled in the art after reading a detailed description of the preferred embodiment.

BRIEF DESCRIPTION OF THE DRAWING(S)

Figure 1:
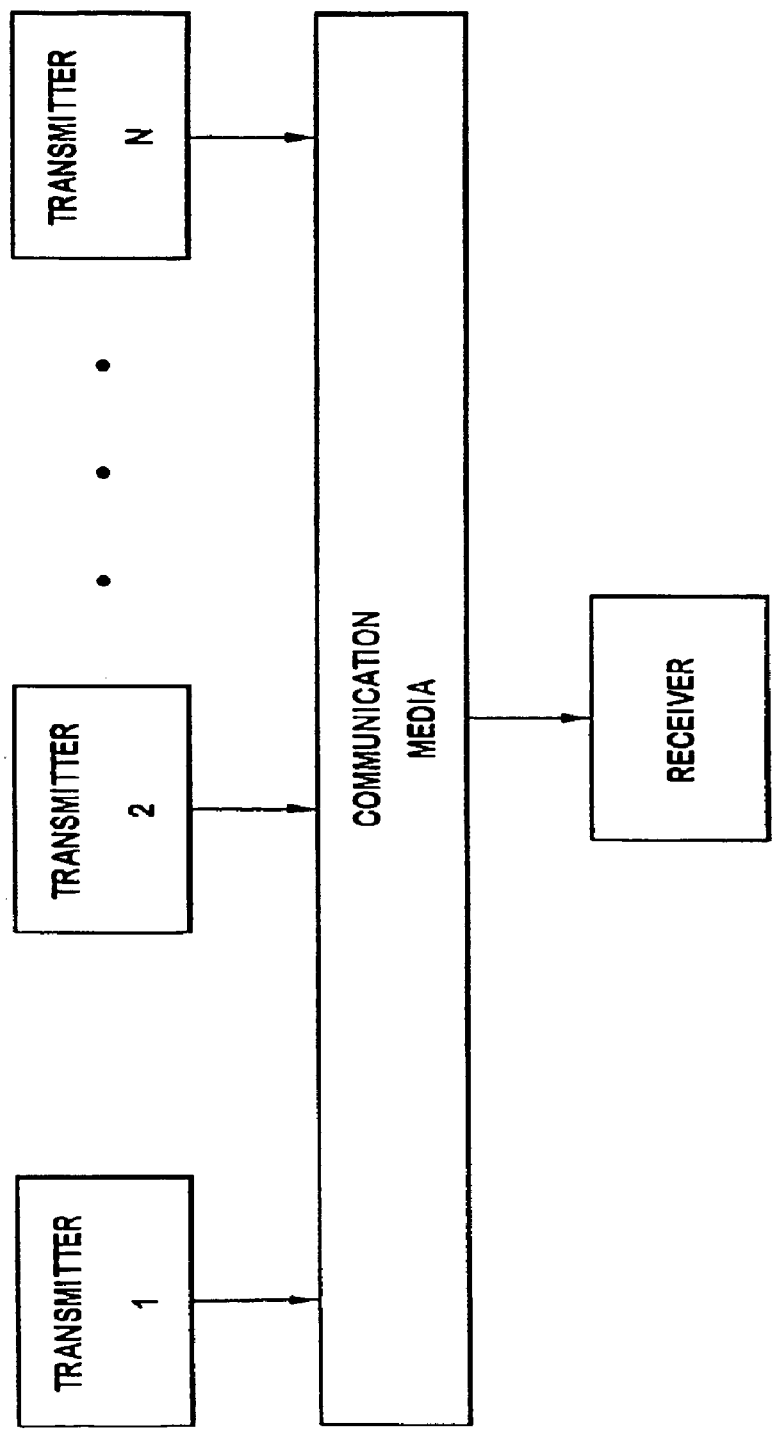
FIG. 1 is a simplified block diagram of a prior art multiple access communication system

FIGS. 6a–d are control flow diagrams of the method of the present invention

FIGS. 7a–d is a data flow diagram of the present invention.

DETAILED DESCRIPTION OF THE PREFERRED EMBODIMENT(S)

The present invention will be described with reference to the drawing figures where like numerals represent like elements throughout.

Figure 5:
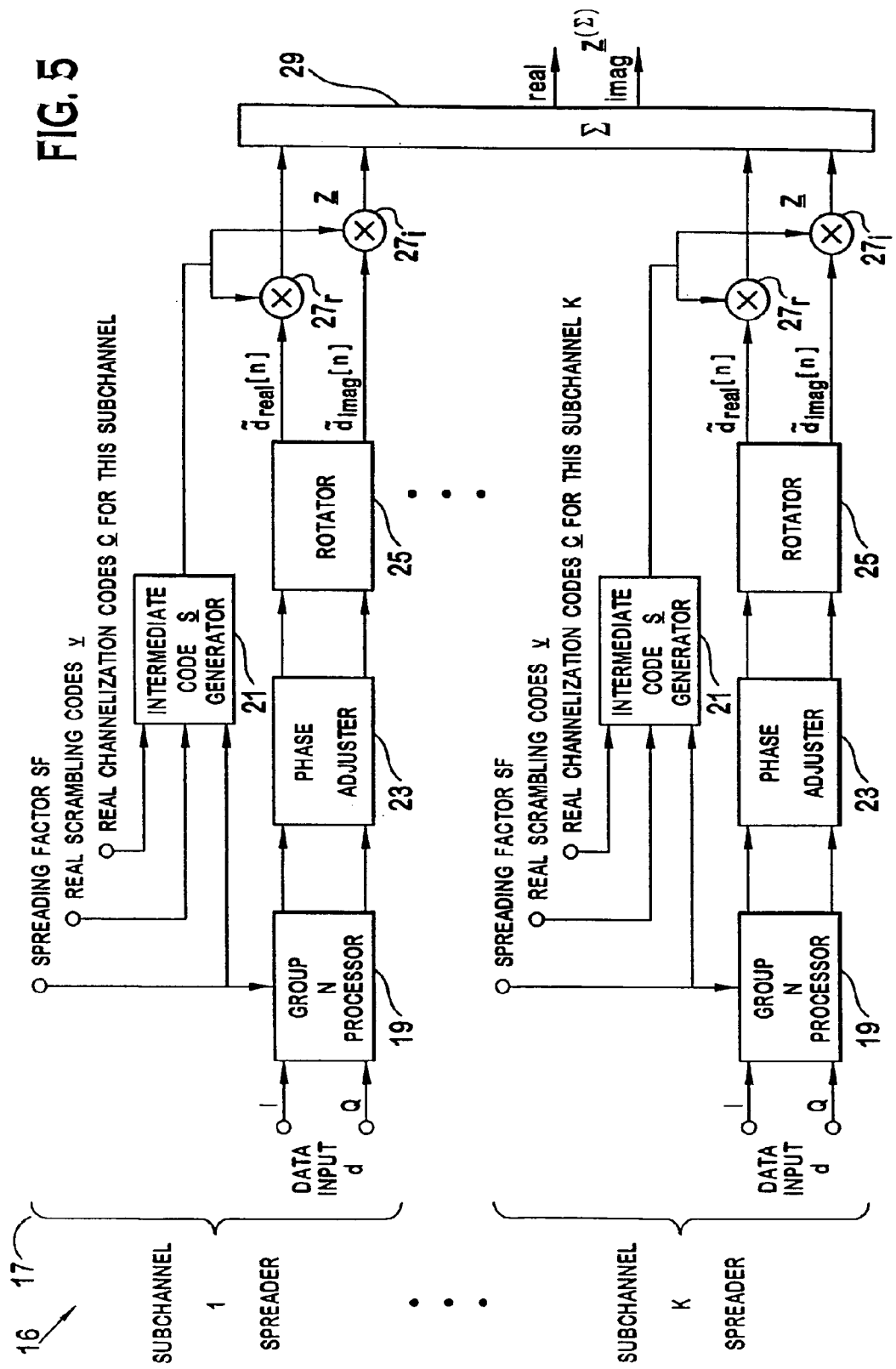
FIG. 5 is a system architecture of the present invention.

Shown in FIG. 5 is a system diagram of the spreader 17 of present invention for use in communication systems employing CDMA. The spreader 17 comprises a plurality of processors having collateral memory which perform various vector and matrix operations. Alternate physical embodiments of the invention include fixed gate arrays, ASICs, DSPs and the like performing the equivalent functions of the various processors. As one skilled in this art recognizes, optimization techniques tailored for each physical embodiment may vary when implementing the spreader 17. The spreader 17 also comprises a plurality of data inputs $d^{(l)} \ldots d^{(k)}$ for inputting modulated user data d of subchannel k and an output $\underline{z}^{(\Sigma)}$ for outputting a combined spread spectrum signal in the form of an output vector.

To simplify the explanation of the present invention that follows, only one subchannel k spreading operation will be described, thereby eliminating the need for unique subchannel identification throughout. Each data input $d^{(l)} \ldots d^{(k)}$ may have from one to a plurality of channelization codes and from one to a plurality of scrambling codes assigned depending upon the degree of user and cell separation. The terms channelization and scrambling are arbitrary and represent a plurality of spreading codes that vary in length depending upon the assigned spreading factor SF of a subchannel k and the requirements of a communication system. At least one assigned spreading code for each subchannel k must be exclusive to all other codes in the communication system to maintain subchannel separation for each user.

Each assigned code must have the same length, either as a periodic short code assembly or a code having the maximum spreading factor $SF_{max}$ length. Alternative embodiments of the spreader 17 result from the number of codes assigned for a subchannel k. A plurality of spreaders 17 may be deployed in transmitters for a communication system.

The spreader 17 spreads the data symbols of subchannel k using a plurality of channelization and scrambling codes. These codes may be all real, all complex or some may be real while others may be complex. The spreader 17 comprises an intermediate code generator 21, a group N processor 19, a phaser adjustor 23, a rotator 25, two multipliers 27r and 27i and a summer 29.

Recall that length of a code is equal to its spreading factor SF. The intermediate code generator 21 concatenates N periods of each real code of spreading factor SF. It also concatenates N periods of the real part of each complex code of spreading factor SF. Thus each code of spreading factor SF yields a long code of length $SF_{max}$. It then multiplies all of these long codes via an element-by-element multiplication of the resulting vector with all real codes of spreading factor $SF_{max}$ and the real part of all complex codes of length $SF_{max}$. This results in the final output of the intermediate code generator 21, which is a single real code of length $SF_{max}$.

The group N processor 19 determines the group size N as the ratio $\underline{SF}_{max}$ and then SF assembles a group of N symbols. The spreader 17 spreads one such group at a time.

The phase adjuster 23, imparts an initial phase to each of the N symbols in the group assembled by the group N processor 19. The phase imparted to a symbol is a function of the position of the symbol within its group. Thus, the output of the phase adjustor 23 is a group of N symbols where each symbol has been given a specific phase rotation.

The rotator 25 accounts for the complex codes by forming a sequence of length SF corresponding to each of these symbols in the group of N symbols obtained from the output of the phase adjustor 23. It does so by rotating each phase-adjusted symbol SF times, with the degree of rotation being a function of the total number of complex codes in the system. Then, the N such complex sequences corresponding to each of the N symbols in the group are concatenated to form a single complex sequence of length $N \cdot SF = SF_{max}$, which forms the final output of the rotator 25.

The complex sequence output of the rotator 25 is multiplied, element-by-element, with the intermediate code generator 21 output. This multiplication is accomplished via the multipliers 27r and 27i. The multipliers 27r and 27i multiply the real intermediate code with the real and imaginary parts, respectively, of the complex sequence output of the rotator 25.

The output of the multipliers 27r and 27i is the final spread sequence of the group of N symbols of a subchannel. The summer 29 adds the final spread sequence of all subchannels to form a single sequence output of the spreader 17.

Since channelization codes are employed for user separation and scrambling codes are employed for cell separation, the channelization code and scrambling codes are known a priori according to cell location and are transmitted to a respective user from a cell base station via a learning transmission. The learning transmission is beyond the scope of this disclosure. M channelization codes are available for use, $$\tilde{c}_1 \ldots \tilde{c}_{M_1}, c_{M_1+1} \ldots c_M$$

of which the first $M_1$ are complex and the remaining are real. The $n^{th}$ element of the $i^{th}$ complex channelization code is defined as:

$$\tilde{c}_i[n] = j^n \cdot c_i[n], \text{ where } n=1, \ldots SF \text{ and where } \underline{c}_i \text{ is real.} \quad (6)$$

The subchannel k also can utilize P scrambling codes, $$\tilde{v}_1 \ldots \tilde{v}_{P_1}, v_{P_1+1} \ldots v_P$$

of which the first $P_1$ are complex and the remaining are real. The $n^{th}$ element of the $i^{th}$ complex scrambling code is defined as:

$$\tilde{v}[n]=j^n \cdot v_i[n], \text{ where } n=1, \ldots SF_{max} \text{ and where } v_i \text{ is real.} \quad (7)$$

Referring to the flow diagram of the method 97 of the present invention shown on FIGS. 6a–d, data d which has undergone modulation and comprises a series of data symbols is input into the spreader 17. A symbol group size N for subchannel k is determined by the group N processor 19 using Equation 3 (step 99). Since different channelization codes $\underline{c}$ have different lengths due to their different spreading factors SF, N periods of the respective channelization codes $\underline{c}$ are concatenated (step 101) to form a periodic long code $\underline{c}_p$, equal in length to the maximum spreading factor $SF_{max}$ of the communication system. Concatenation is not required when N is equal to one ($SF=SF_{max}$).

In order to simplify the explanation of the method 97, $\underline{c}$ represents the product of all real channelization codes that have been concatenated $\underline{c}_p$. Included in $\underline{c}$ are the real codes from which the complex channelization codes are derived. The $n^{th}$ element of $\underline{c}$ is defined as:

$$c[n]=c_1[n] \cdot c_2[n] \ldots c_M[n], \text{ where } n=1, \ldots SF. \quad (8)$$

Additionally, $\underline{v}$ represents the product of all real scrambling codes. Included in $\underline{v}$ are the real codes from which the complex scrambling codes are derived. The $n^{th}$ element of $\underline{v}$ is defined as:

$$v[n]=v_1[n] \cdot v_2[n] \ldots v_P[n], \text{ where } n=1, \ldots SF_{max}. \quad (9)$$

An intermediate real code $\underline{s}$ is computed (step 103) from each concatenated channelization code sequence $\underline{c}_p$ and the real scrambling code $\underline{v}$ by performing an element-by-element multiplication of the two vectors in the intermediate code $\underline{s}$ generator 21. Multiplication is allowed since both vectors are of the same length. The $n^{th}$ element of the intermediate code $\underline{s}$ is defined by:

$$s[n]=c_p[n] \cdot v[n], \text{ where } n=1, \ldots SF_{max} \quad (10)$$

where $\underline{c}_p$, is a product of the periodic extensions of the subchannel k channelization codes $\underline{c}$, containing N periods of $\underline{c}$ corresponding to the spreading factor SF. Intermediate real code $\underline{s}$ of length $SF_{max}$ is computed (step 103) using $\underline{v}$ and $\underline{c}$ and is made up of M+P real codes.

The intermediate code $\underline{s}$ is computed once for a given ($k^{th}$) subchannel. Efficiency is gained since the computation is performed once for the entire data sequence for transmission of subchannel k. Group N count (step 105) is initialized and a vector $\underline{d}$ comprising N symbols is assembled (step 107) in the group N processor 19. Symbol $d_i$ count is initialized (step 109).

The spreader 17 improves processing speed by recognizing that the generation of each subsequence $z_i$ (Equation 5) involves the complex sequence $j^{SF(i-1)+n}$ where $n=1, \ldots SF$. This sequence arises since each complex code $\tilde{c}, \tilde{v}$ is derived from a real scrambling code $\underline{c}, \underline{v}$ via multiplication with the complex sequence $j^n$ (Equation 4). Referring to Equation 5 and using the commutative property of multiplication, the product of the real channelization codes $\underline{c}_p$ and the real scrambling codes $\underline{v}$ are available via the intermediate code $\underline{s}$ (step 103). Equation 5 representing the $n^{th}$ element of $z_i$, (where $z_i$ is the segment of SF chips within $\underline{z}$ that represents the contribution of subchannel k's $i^{th}$ spread symbol, $d_i$ in the group), becomes:

$$z_i[n]=d_i \cdot c[n] \cdot v[SF(i-1)+n] \cdot j^{P_1 SF(i-1)} \cdot j^{(P_1+M_1)n} \quad (11)$$

where $n=1 \ldots SF$ and $i=1, 2, \ldots N$.

To complete the spreading process for a group, a multiplication of the intermediate code $\underline{s}$ with a concatenation of all symbols in the group is required. The spreader 17 of the present invention obviates a plurality of multiplications by recognizing that each multiplication with the complex operator j is equivalent to an anti-clockwise rotation of the multiplicand that varies in the number of degrees. The rotation involves an exchange of the real and imaginary parts with a change of sign. The $n^{th}$ element of $\tilde{d}_i$ is obtained from a multiplication of its $(n-1)^{th}$ element with the complex operator $j^{(P_1+M_1)}$ and is defined as:

$$\tilde{d}_i[n]=j^{(P_1+M_1)} \tilde{d}_i[n-1], \text{ where } n=1, \ldots SF \quad (12)$$

where the $0^{th}$ element of $\tilde{d}_i$ is initialized as:

$$\tilde{d}_i[0]=d_i j^{SF(i-1)P_1} \quad (13)$$

Equation 13 initializes $\tilde{d}_i[0]$ by imparting an initial phase $d_i$, which is a function of the spreading factor SF, the position i within the group of the symbols being spread and the number of complex scrambling codes $P_1$. Step 111 performs the first step of this initialization.

Invoking the equivalence between a multiplication with a complex operator j and an anti-clockwise rotation of the multiplicand by 90 degrees, the real and imaginary components of the $n^{th}$ element of $\tilde{d}_i$ are derived from the imaginary and real components, respectively, of its $(n-1)^{th}$ element. Since a group of N symbols is spread with N periods of the subchannel k spreading factor SF channelization codes $\underline{c}$, i takes the value from $i=1, \ldots N$.

After a symbol count i is initialized (step 109), a group of N symbols is processed and $d_i[0]$ is initialized (step 111). When the spreading factor SF satisfies the following:

$$SF \cdot P_1=4q, \text{ for any integer } p, \quad (14)$$

Equation 12 reduces to $\tilde{d}_i[0]=d_i$ since $j^{4q}=1$ for any integer q. For the case when SF does not satisfy the condition of Equation 14 (step 113), $\tilde{d}_i[0]$ is obtained by imparting an initial phase of $\tilde{d}_i[0]=j^{SF(i-1)P_1}\tilde{d}_i[0]$ to the symbol $d_i$ (step 115).

The method 97 proceeds with four tests to determine the amount of symbol rotation required depending upon the number of complex spreading codes in use. For the case when $M_1+P_1=4_p$ (step 117), where p is any integer, the real and imaginary components of the $n^{th}$ element of $\tilde{d}_i$ are derived from the real and imaginary components with the complex operator being $j^{(P_1+M_1)}=1$, and its $(n-1)^{th}$ elements as shown by Equations 15 and 16 in step 119. The rotator 25 rotates the $(n-1)^{th}$ element of $\tilde{d}_i$ by 0 degrees to obtain its $n^{th}$ element.

For the case when $M_1+P_1=4p+1$ (step 135), where p is any integer, the real and imaginary parts of the $n^{th}$ element of $\tilde{d}_i$ are derived from the imaginary and real parts with the complex operator being $j^{(P_1+M_1)}=j$, and its $(n-1)^{th}$ elements as shown by Equations 17 and 18 in step 123. The rotator 25 rotates the $(n-1)^{th}$ element of $\tilde{d}_i$ at by 90 degrees anti-clockwise to obtain its $n^{th}$ element.

For the case when $M_1+P_1=4p+2$ (step 125), where p is any integer, the real and imaginary parts of the $n^{th}$ element of $\tilde{d}_i$ are derived from the real and imaginary components with the complex operator being $j^{(P_1+M_1)}=-1$, and its $(n-1)^{th}$ element as shown by Equations 19 and 20 in step 127. The rotator 25 rotates the $(n-1)^{th}$ element of $\underline{d}_i$ by 180 degrees anti-clockwise to obtain its $n^{th}$ element.

For the remaining case when $M_1+P_1=4p+3$ (step 129), where p is any integer, the real and imaginary parts of the $n^{th}$ element of $\tilde{d}_i$ are derived from the real and imaginary components with the complex operator being $j^{(P_1+M_1)}=-j$, and its $(n-1)^{th}$ element as shown by Equations 21 and 22 in step 131. The rotator 25 rotates the $(n-1)^{th}$ element of $\tilde{d}_i$ by 270 degrees anti-clockwise to obtain its $n^{th}$ element.

The resultant SF chip long intermediate chip sequence $\tilde{d}_i$ is computed for the $i^{th}$ symbol in the group of N symbols by employing SF rotations as described by Equations 15–22. Actual multiplication is replaced by the rotator 25 performing shift operations shown in FIGS. 7a–d that correspond to the aforementioned 0 degrees, 90 degrees, 180 degrees and 270 degrees rotations respectively to compute the SF chip long vector $\tilde{d}_i$.

As shown in the FIGS. 7a–d, at the $i^{th}$ symbol interval, the $0^{th}$ element of $\tilde{d}_i$ is initialized from the new complex data symbol $\underline{d}_i$ per Equation 13. If the determined amount of symbol rotation is 90 degrees, 180 degrees or 270 degrees, the real and imaginary components of $\tilde{d}_i[0]$ are loaded into a register holding the real $\tilde{d}_{i,real}[n]$ and imaginary $\tilde{d}_{i,imag}[n]$ components of $\tilde{d}_i[n]$. The real and imaginary components of $\tilde{d}_i[n]$ are shifted around in the register at the chip rate. The register has two memory elements, which together with a feedback path accomplish the derivation of the real and imaginary components of the $n^{th}$ element of $\tilde{d}_i$ from the imaginary and real components, respectively, of its $(n-1)^{th}$ element, (Equations 17–22). The multiplication with -1 accounts for required sign changes. Rotator 25 outputs $z_{real}$, $z_{imag}$ tapped at the $n^{th}$ chip interval as $$\tilde{d}_{i,real}[n] \text{ and } \tilde{d}_{i,imag}[n].$$

Thus, the rotator outputs over n=1, . . . SF chip intervals to represent the SF chip long vector $$\tilde{d}_i,$$

i.e., the product of the data symbol $d_i$ with the $j^{SF(i-1)+n}$, n= 1, . . . SF.

Figure 2:
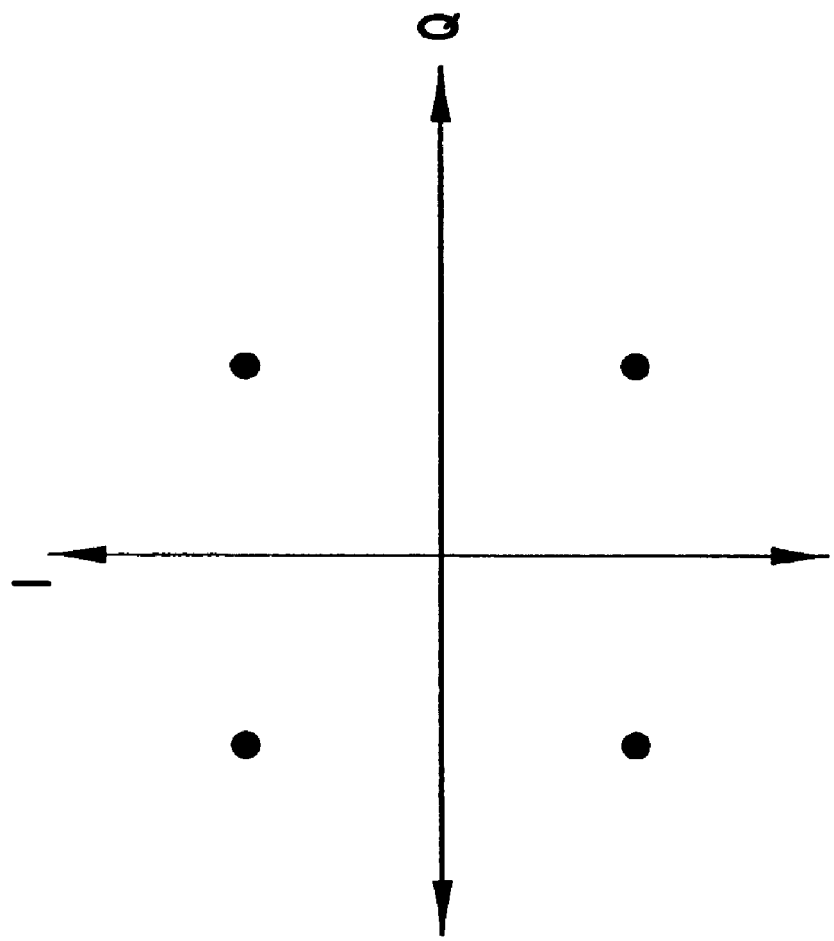
FIG. 2 is a plot of a quadrature signal space
Figure 3:
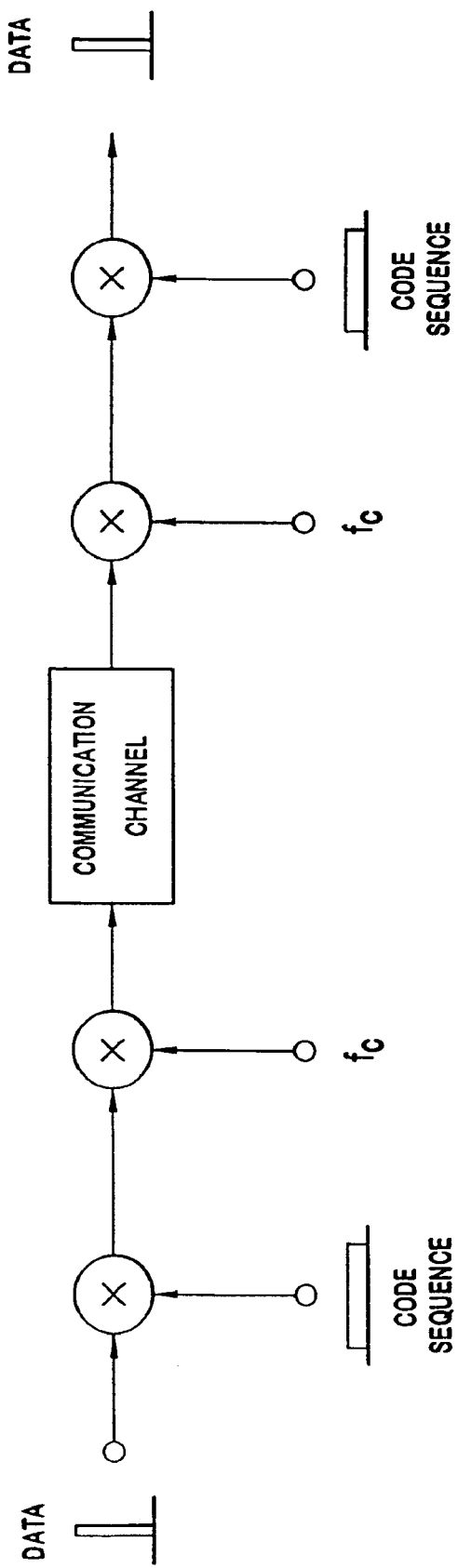
FIG. 3 is a simplified block diagram of a prior art CDMA communication system.
Figure 4:
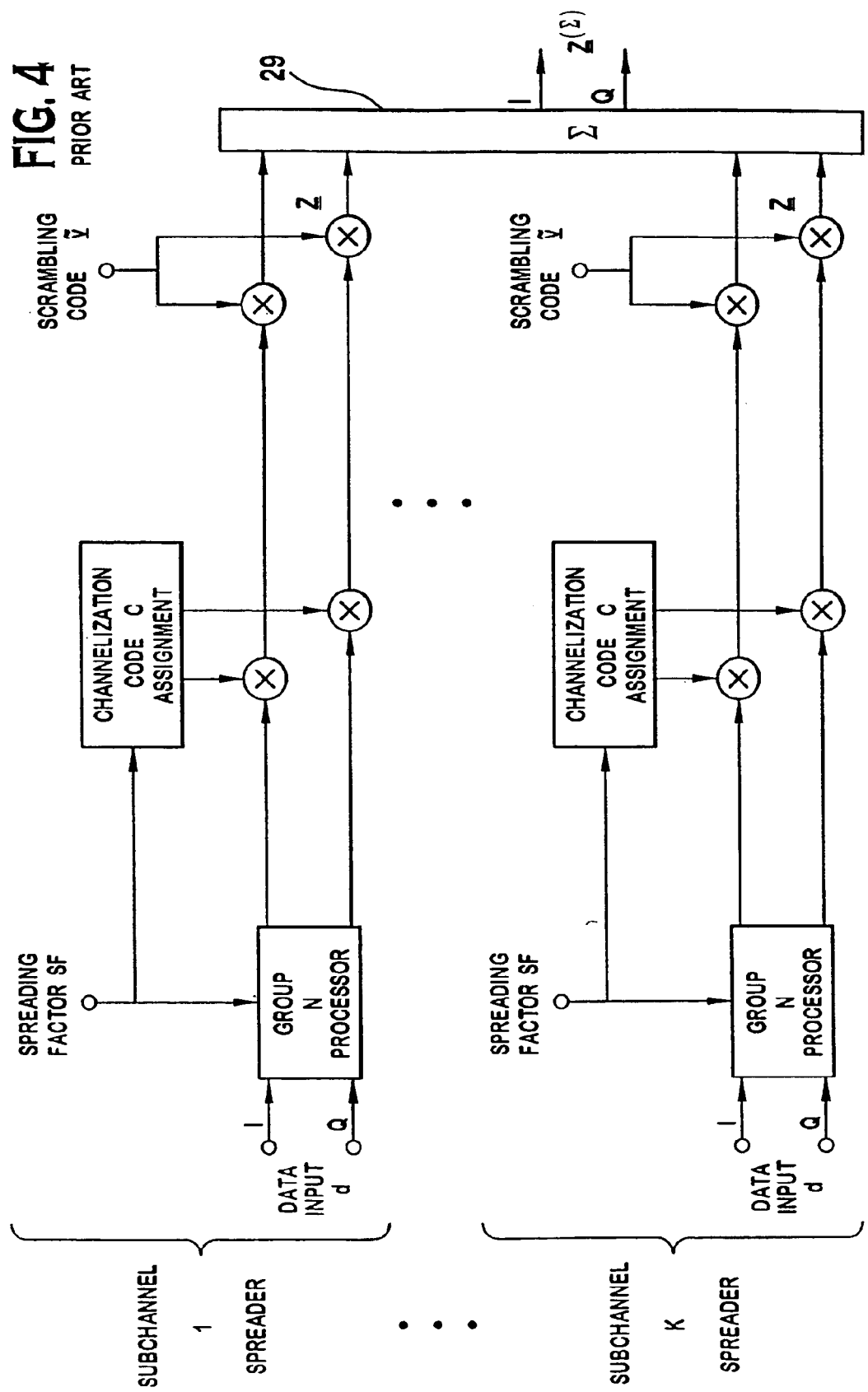
FIG. 4 is a system architecture of a prior art two-part spreader.
Figure 7A:
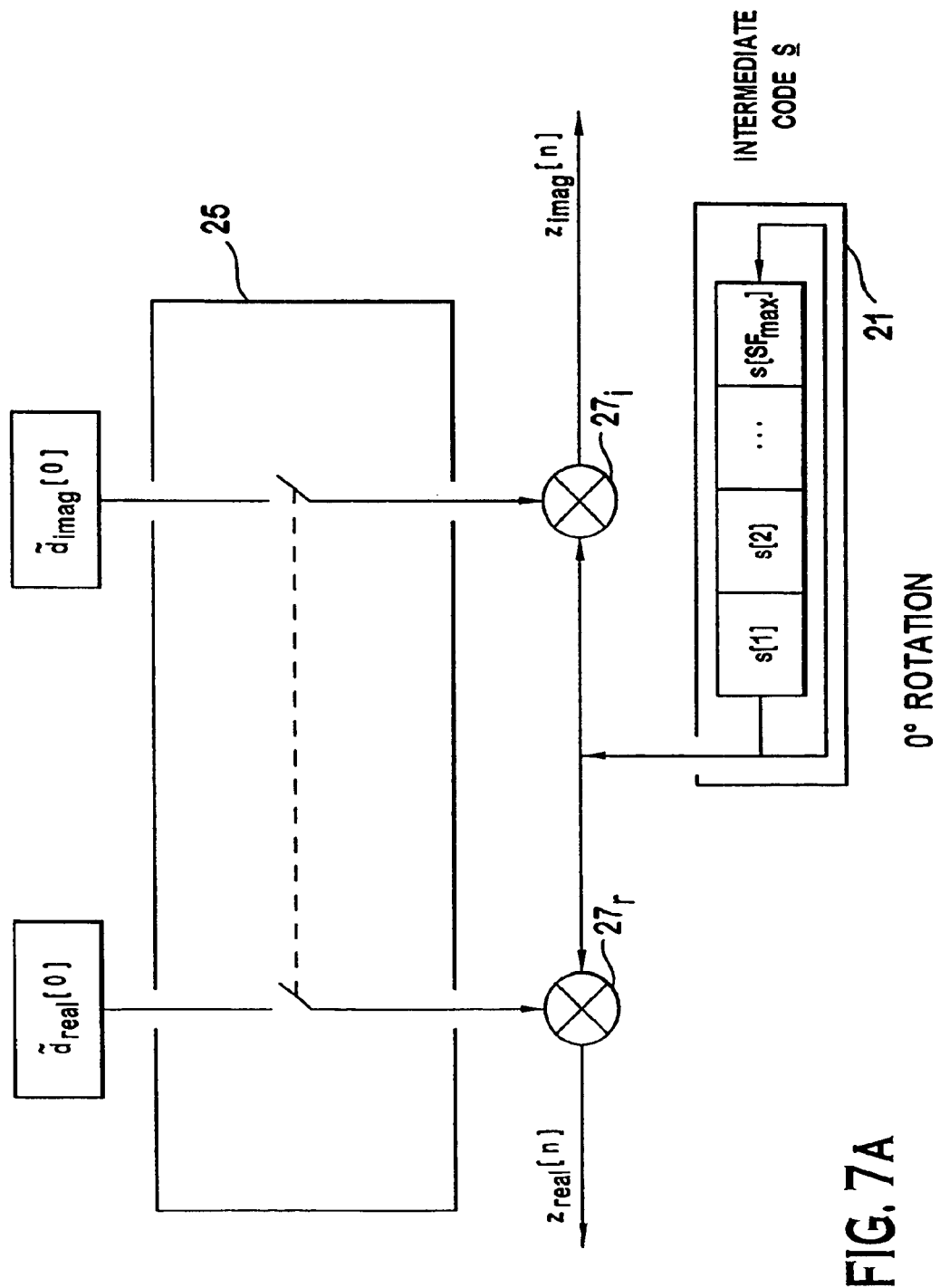
Figure 7B:
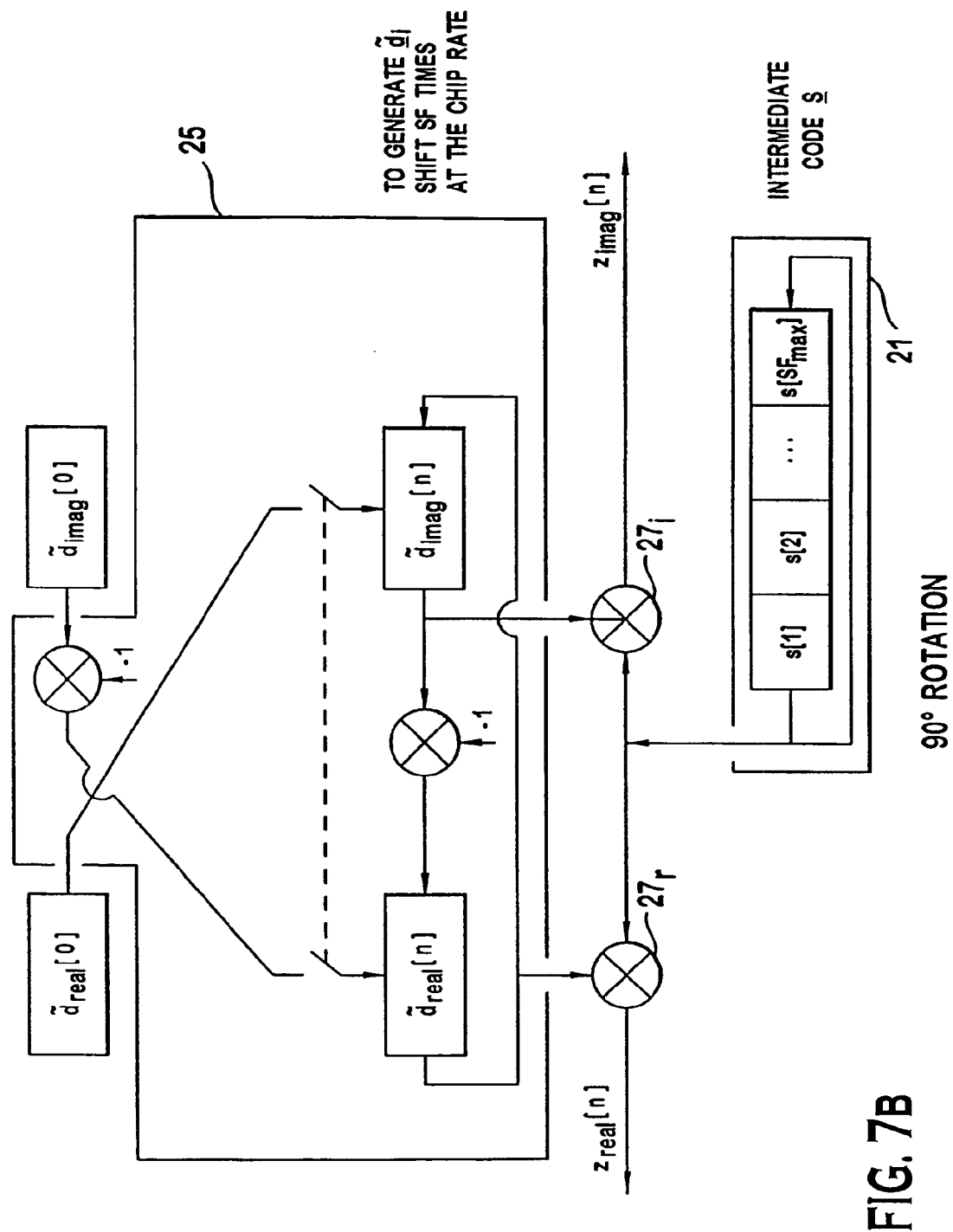
Figure 7C:
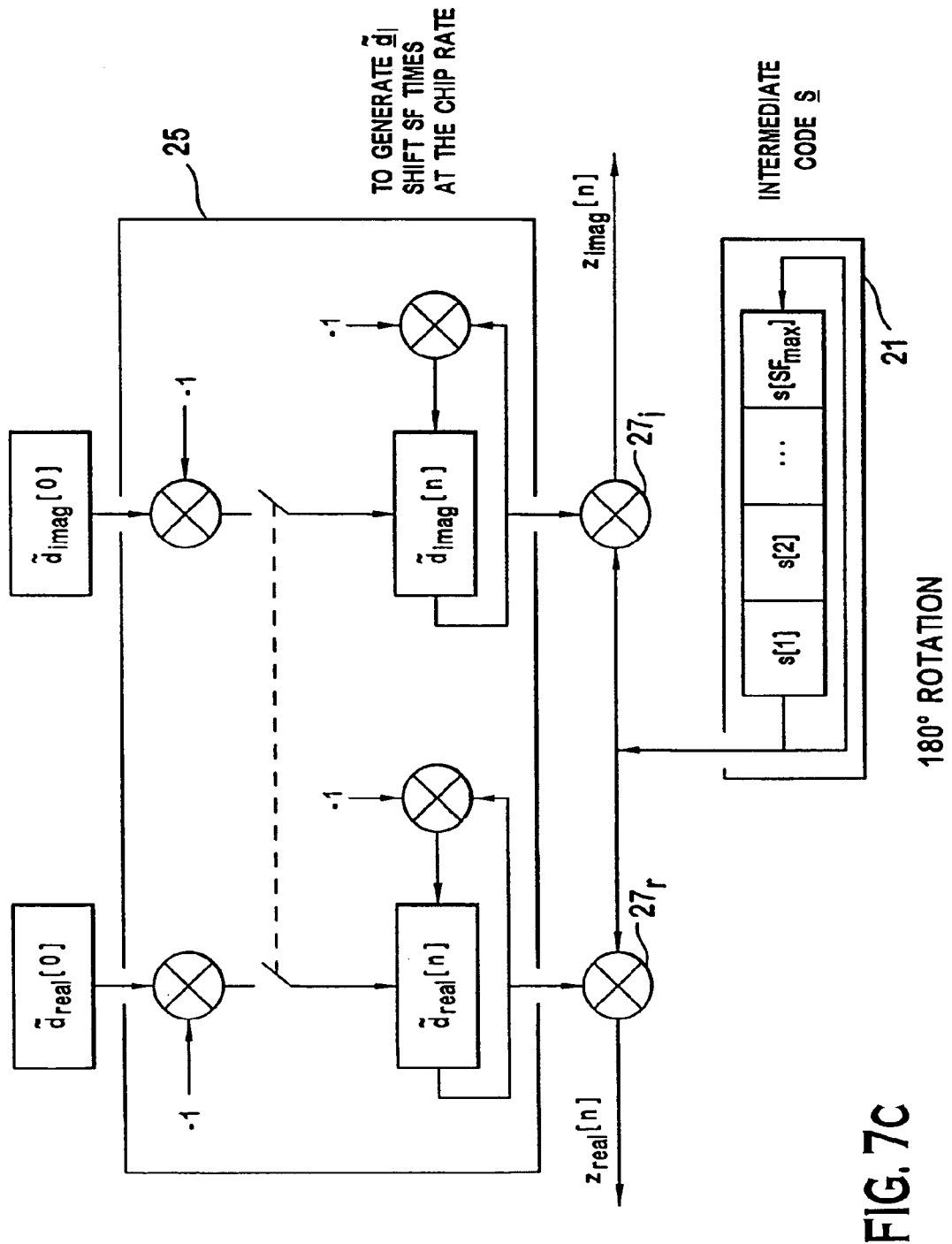
Figure 7D:
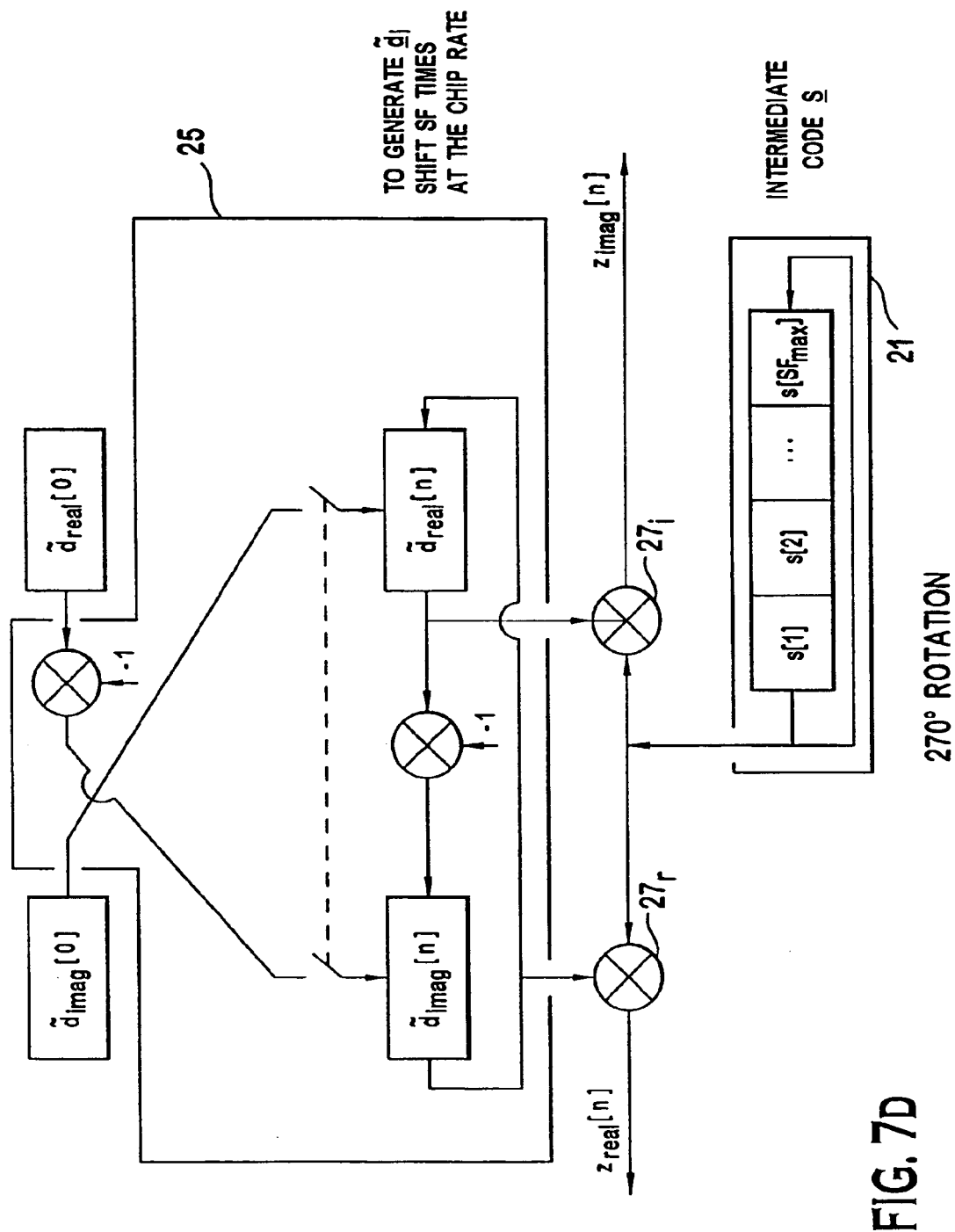

As one skilled in the art should realize, a phase rotation of 0 degrees on the complex plane (FIG. 2) implemented by the rotator 25 shown in FIG. 7a outputs the same real $$\tilde{d}_{i,real}[n]$$

and imaginary $$\tilde{d}_{i,imag}[n]$$

component values of the data symbol input. The symbol does not undergo any phase change. A phase rotation of 90 degrees implemented by the rotator 25 shown in FIG. 7b outputs as the imaginary symbol component $$\tilde{d}_{i,imag}[n]$$

the real data symbol component input and outputs as the real symbol component $$\tilde{d}_{i,real}[n]$$

the imaginary symbol component input along with a change of sign. A phase rotation of 180 degrees implemented by the rotator 25 shown in FIG. 7c outputs as the imaginary symbol component $$\tilde{d}_{i,imag}[n]$$

the imaginary data symbol component input along with a change of sign and outputs as the real symbol component $$\tilde{d}_{i,real}[n]$$

the real symbol component input along with a change of sign. A phase rotation of 270 degrees implemented by the rotator 25 in FIG. 7d outputs as the imaginary symbol component $$\tilde{d}_{i,imag}[n]$$

the imaginary data symbol component input, and outputs as the real symbol component $$\tilde{d}_{i,real}[n]$$

the real symbol component input along with a change of sign

Figure 6A:
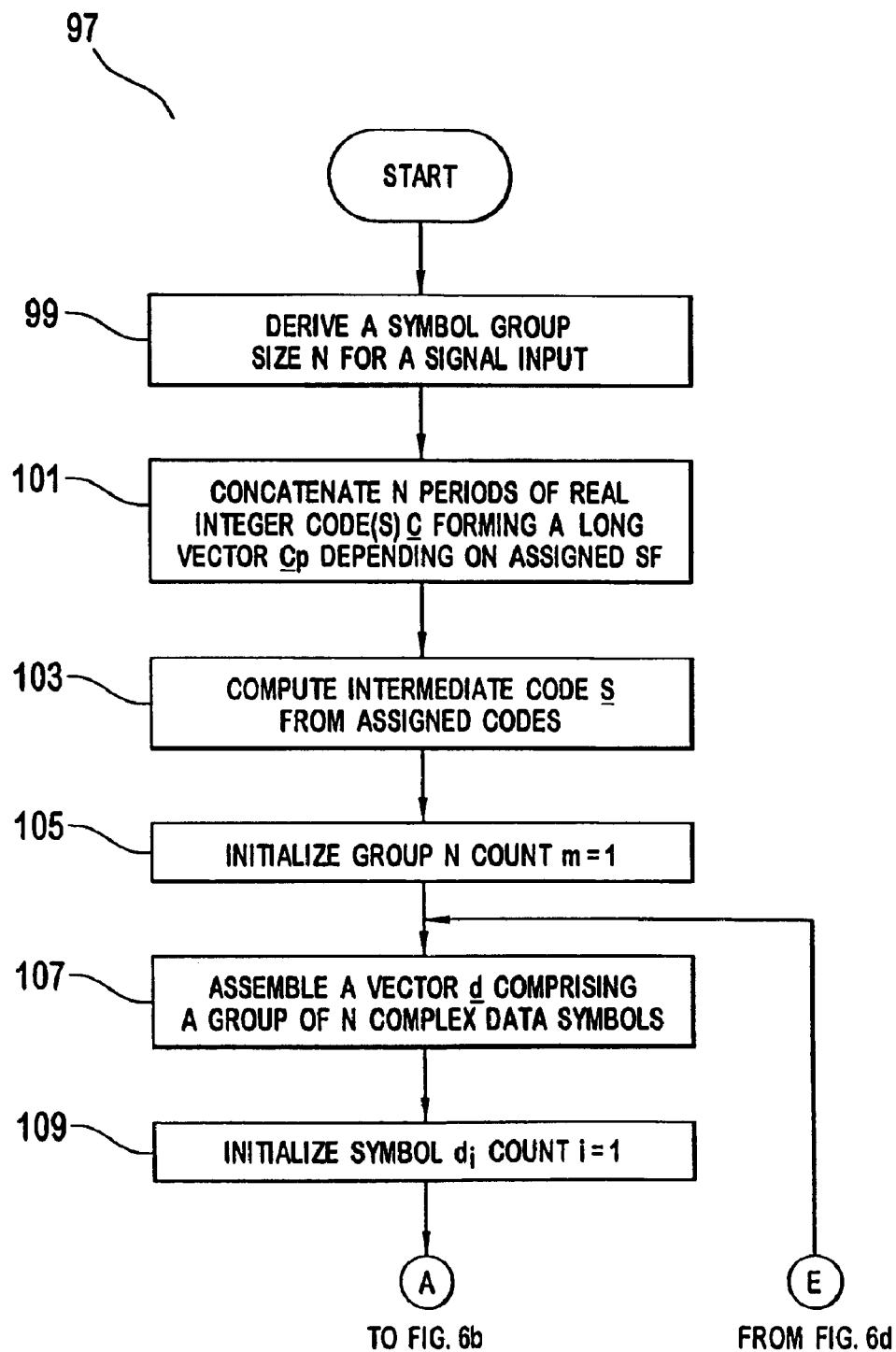
Figure 6B:
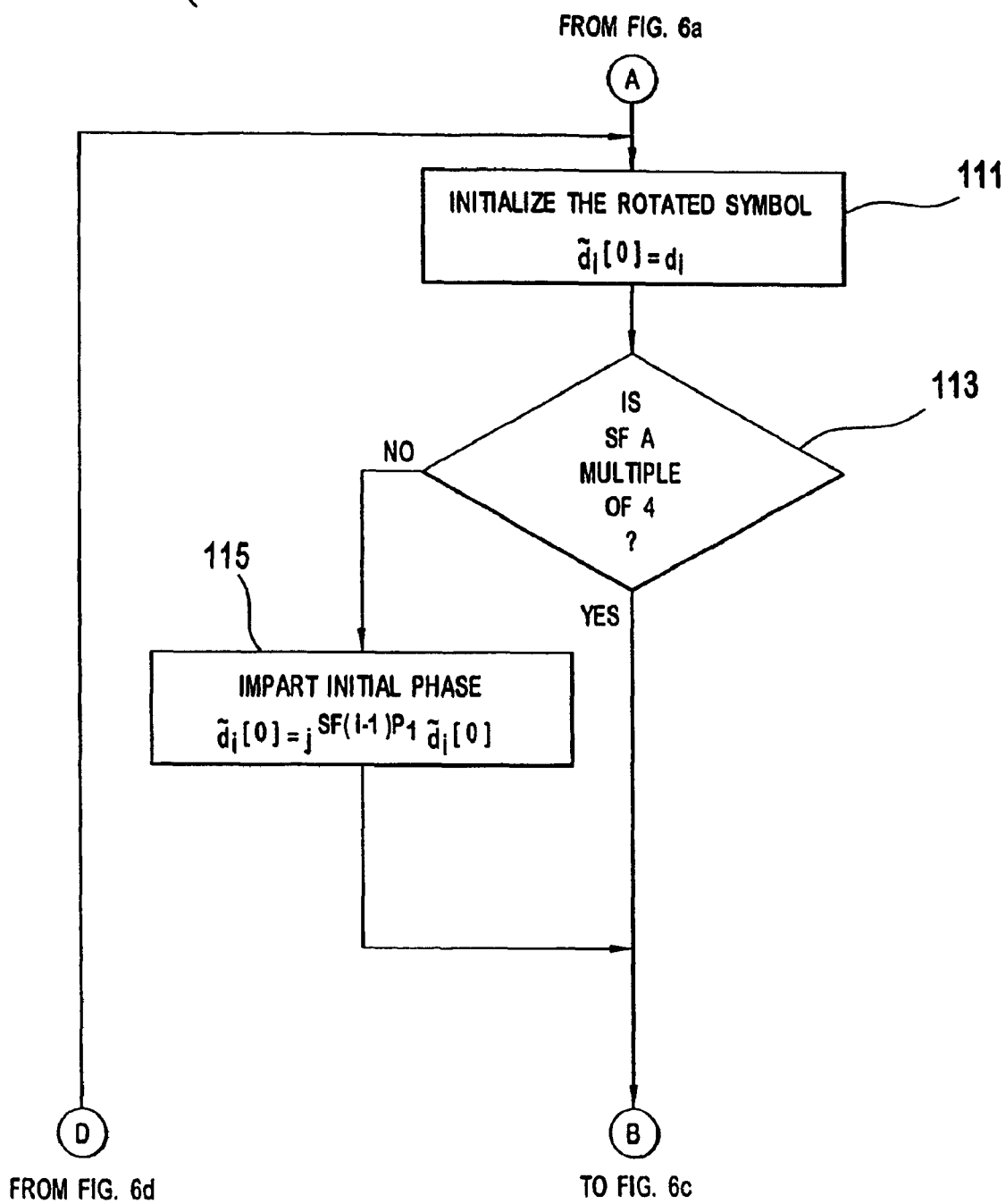
Figure 6C:
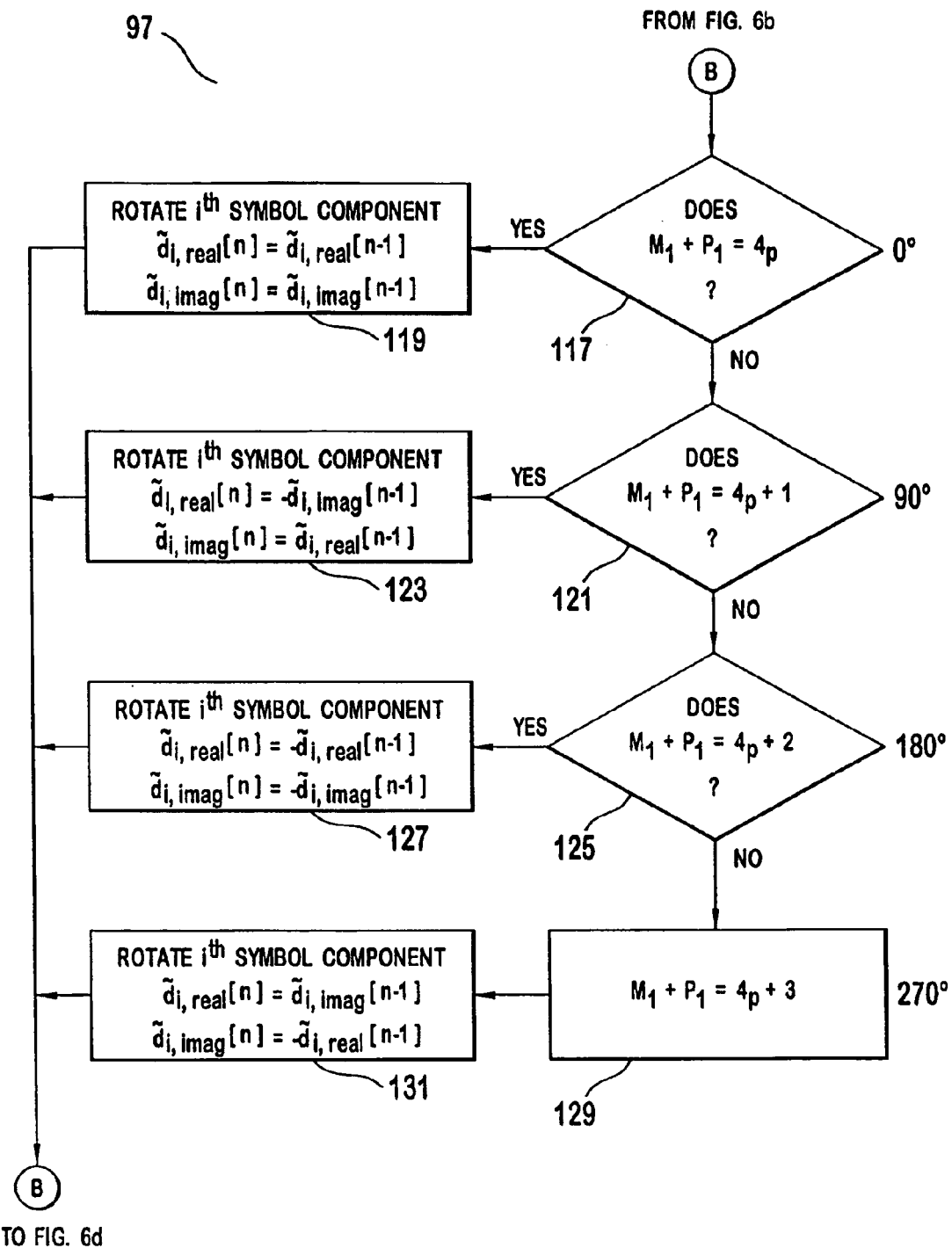
Figure 6D:
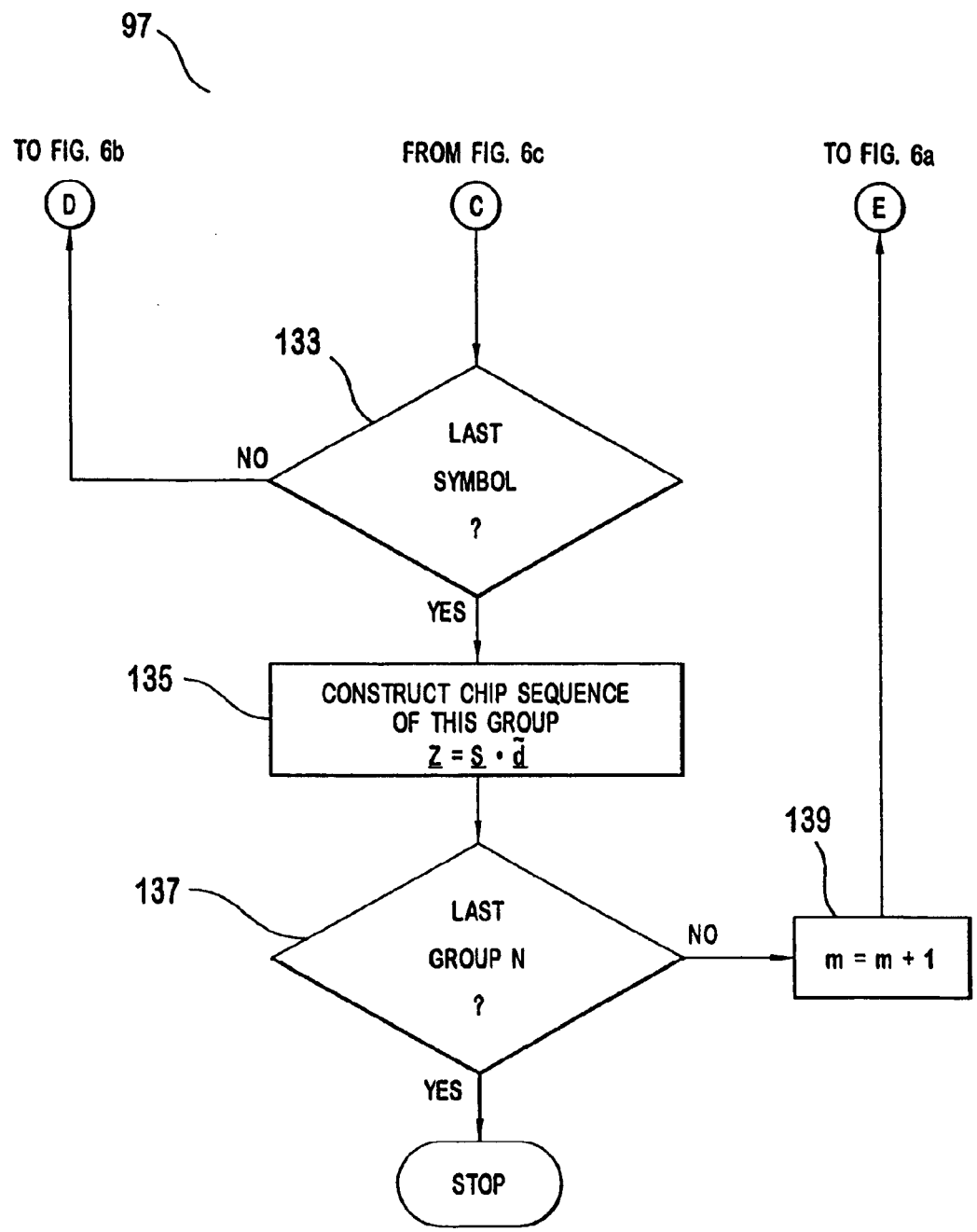

Referring to FIG. 6d, after all remaining symbols in the group are similarly processed (step 133), their $\tilde{d}_i$, i=1 . . . N are concatenated to form $SF_{max}$ long $\tilde{d}_i$ and then multiplied by the intermediate code $\underline{s}$ to arrive at the final spread sequence $\underline{z}$ of the group (step 135). The process is repeated for remaining groups (step 137) and the group index is incremented (step 139) if needed.

Alternative embodiments of spreader 17 may be realized when a specific number of codes are used and do not vary. For example, if the spreader 17 was deployed in transmitters for a communication system that only required two codes for separation, one real and one complex, the total number of complex codes equals one, satisfying the test $M_1+P_1=4p+1$ ($j^{(number\ of\ complex\ codes) modulo\ 4}$) (step 121) thereby requiring only a 90 degree rotation. The remaining tests for 0, 180 and 270 degree rotations (steps 117, 125, 129) and their associated rotations (steps 119, 127 and 131) are obviated. Any number of codes may be combined to spread the data assembled in the group N processor 19.

While the present invention has been described in terms of the preferred embodiments, other variations which are within the scope of the invention as outlined in the claims below will be apparent to those skilled in the art.

What is claimed is:

1. A communication system having a spreader for spreading a data signal comprising at least a plurality of data symbols; the system assigning at least one of a plurality of spreading codes where at least one of said plurality of spreading codes is complex, the spreader characterized by:

a data input for receiving data symbols;

a control input, for receiving an assigned spreading factor for the data signal;

a processor for defining a group of symbols for spreading based upon said assigned spreading factor;

an intermediate code generator for computing a spreading code based upon said assigned spreading factor and at least one code from a plurality of real codes derived from said plurality of assigned spreading codes, said intermediate code generator outputting an intermediate code; and a rotator for performing a phase rotation of each symbol in said group to generate a complex quantity, said complex quantity being spread with said intermediate code and output as a spread data signal.

2. The system of claim 1 wherein said processor defines said group using the relationship:

$$N = \frac{SF_{max}}{SF}$$

where N is a real number denoting the number of data symbols in said group, $SF_{max}$ denotes the maximum spreading factor of the communication system and SF is the assigned spreading factor of the data signal.

3. The system of claim 2 wherein the amount of said phase rotation performed by said rotator is dependent upon the total number of assigned spreading codes.

4. The system of claim 2 wherein said plurality of assigned spreading codes is further characterized by both channelization codes and scrambling codes.

5. The system of claim 4 further characterized by said channelization codes including complex and real codes and said scrambling codes including complex and real codes.

6. The system of claim 5 wherein the amount of said phase rotation by said rotator is dependent upon the total number of complex channelization and complex scrambling codes assigned.

7. The system of claim 6 wherein said phase rotation is further characterized by $j^{(total\ number\ of\ complex\ codes)modulo\ 4}$ where a remainder of 0 results in 0 degrees of rotation, a remainder of 1 results in 90 degrees of rotation, a remainder of 2 results in 180 degrees of rotation and a remainder of 3 results in 270 degrees of rotation.

8. A method of spreading a data signal comprising a plurality of data symbols for transmission in a communication system assigning at least one of a plurality of spreading codes, where at least one of the assigned spreading codes from the plurality of spreading codes is complex, the method characterized by the steps of:

(a) computing a spreading factor;

(b) defining a group of symbols for spreading based upon said spreading factor;

(c) generating a plurality of real codes corresponding to said plurality of spreading codes;

(d) generating an intermediate code based upon said spreading factor and at least one of said plurality of real codes;

(e) rotating each of said symbols of said group to generate a complex spreading code; and (f) mixing said complex spreading code with said intermediate code to generate an output spreading code.

9. The method according to claim 8 wherein said defining step is further characterized by the step of deriving the size of said group using the formula:

$$N = SF_{max}/SF$$

where N is a real number denoting the number of data symbols in a group, $SF_{max}$ denotes the maximum spreading factor of the communication system and SF is the computed spreading factor.

10. The method according to claim 9 wherein the rotating step is further characterized by differing degrees of rotation in dependence upon the number of complex spreading codes assigned.

11. The method according to claim 10 wherein said rotating step is further characterized by the steps of:

(d1) rotating 0 degrees when $j^{(total\ number\ of\ complex\ codes)modulo\ 4}$ remainder is 1;

(d2) rotating 90 degrees when $j^{(total\ number\ of\ complex\ codes)modulo\ 4}$ remainder is j;

(d3) rotating 180 degrees when $j^{(total\ number\ of\ complex\ codes)modulo\ 4}$ remainder is 1; and (d4) rotating 270 degrees when $j^{(total\ number\ of\ complex\ codes)modulo\ 4}$ remainder is j.

12. The method according to claim 11 wherein said plurality of signal spreading codes is further characterized by channelization codes and scrambling codes.

13. The method according to claim 12 wherein said channelization codes further include complex channelization codes and said scrambling codes further include complex scrambling codes.

14. The method according to claim 13 further characterized by the step of summing said number of complex channelization codes and complex scrambling codes.

* * * * *

UNITED STATES PATENT AND TRADEMARK OFFICE
CERTIFICATE OF CORRECTION

| | |
|---|---|
| PATENT NO. | : 6,885,692 B2 |
| APPLICATION NO. | : 09/810596 |
| DATED | : April 26, 2005 |
| INVENTOR(S) | : Misra et al. |

It is certified that error appears in the above-identified patent and that said Letters Patent is hereby corrected as shown below:

At column 1, line 7, after the word "60/191,884", delete ";", and insert therefore --,--

At column 3, line 16, after the word "operation", delete "maybe", and insert therefor -- may be--.

At column 5, line 36, after the word "inputs", delete "$d^{(l)}$", and insert therefor --$d^{(1)}$--.

At column 5, line 43, after the word "input", delete "$d^{(l)}$", and insert therefor --$d^{(1)}$--.

At column 7, line 10, equation 7, delete " $\widetilde{v}[n]$ ", and insert therefor -- $\widetilde{v}_i[n]$ --.

At column 8, line 59, after the word "step", delete "135", and insert therefor --121--.

At column 10, line 38, after the word "sign", insert --.--.

Signed and Sealed this

Thirty-first Day of July, 2007

JON W. DUDAS
*Director of the United States Patent and Trademark Office*